United States Patent
Takahashi et al.

(10) Patent No.: US 11,088,866 B2
(45) Date of Patent: Aug. 10, 2021

(54) DRAWING PERFORMANCE IMPROVEMENT FOR AN EXTERNAL VIDEO OUTPUT DEVICE

(71) Applicant: LENOVO (Singapore) PTE. LTD., New Tech Park (SG)

(72) Inventors: Chikara Takahashi, Yokohama (JP); Takahide Wada, Yokohama (JP); Toshikazu Horino, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/423,780

(22) Filed: May 28, 2019

(65) Prior Publication Data

US 2019/0386844 A1 Dec. 19, 2019

(30) Foreign Application Priority Data

Jun. 15, 2018 (JP) .............................. JP2018-114446

(51) Int. Cl.
| | |
|---|---|
| *H04L 12/28* | (2006.01) |
| *G06F 3/14* | (2006.01) |
| *G06K 9/62* | (2006.01) |
| *H04L 12/18* | (2006.01) |
| *G06F 3/16* | (2006.01) |

(52) U.S. Cl.
CPC .............. *H04L 12/282* (2013.01); *G06F 3/14* (2013.01); *G06F 3/16* (2013.01); *G06K 9/6201* (2013.01); *H04L 12/1822* (2013.01); *H04L 2012/2849* (2013.01)

(58) Field of Classification Search
None
See application file for complete search history.

(56) References Cited

U.S. PATENT DOCUMENTS

| | | | |
|---|---|---|---|
| 9,197,856 B1* | 11/2015 | Tangeland | H04N 5/2624 |
| 10,038,878 B1* | 7/2018 | Seo | H04L 65/1069 |
| 2005/0146598 A1* | 7/2005 | AbiEzzi | H04N 7/142 |
| | | | 348/14.01 |
| 2007/0210932 A1* | 9/2007 | Koshiba | G08C 17/02 |
| | | | 340/12.22 |
| 2009/0058987 A1* | 3/2009 | Thielman | H04N 7/142 |
| | | | 348/14.08 |
| 2009/0079814 A1* | 3/2009 | Hsu | H04N 5/268 |
| | | | 348/14.08 |

(Continued)

FOREIGN PATENT DOCUMENTS

| | | |
|---|---|---|
| JP | 2007243726 A | 9/2009 |
| JP | 2010056979 A | 3/2010 |

(Continued)

*Primary Examiner* — Kate H Luo
(74) *Attorney, Agent, or Firm* — Kunzler Bean & Adamson

(57) ABSTRACT

An apparatus for activation control of an external display device for a meeting management device is disclosed. A method and a computer program product perform one or more functions of the apparatus. In one embodiment, the apparatus includes a data transmitter that sends at least one of image data and sound data from an information processing device to an external device that outputs at least one of an image and sound, a signal transmitter that sends a wireless control signal for activating or inactivating the external device, and a device state detector that determines whether the external device is active.

16 Claims, 4 Drawing Sheets

(56) References Cited

U.S. PATENT DOCUMENTS

| | | | | |
|---|---|---|---|---|
| 2009/0122132 A1* | 5/2009 | Thielman | .................. | H04N 9/12 |
| | | | | 348/14.08 |
| 2011/0227951 A1* | 9/2011 | Kubo | .................. | H04L 12/1827 |
| | | | | 345/667 |
| 2013/0294594 A1* | 11/2013 | Chervets | .................. | H04M 3/56 |
| | | | | 379/202.01 |
| 2014/0184725 A1* | 7/2014 | Wu | ........................ | H04N 7/147 |
| | | | | 348/14.07 |
| 2016/0066029 A1* | 3/2016 | Barnett | .................. | G08C 17/02 |
| | | | | 348/734 |
| 2016/0127689 A1* | 5/2016 | Huang | ................... | H04N 7/155 |
| | | | | 348/14.08 |
| 2017/0006162 A1* | 1/2017 | Bargetzi | .................. | H04W 4/06 |
| 2018/0306900 A1* | 10/2018 | Birkenes | ................ | H04R 3/005 |
| 2018/0324393 A1* | 11/2018 | Ryan | .................... | G06K 9/2018 |
| 2019/0236554 A1* | 8/2019 | Hill | ........................ | G06Q 10/02 |

FOREIGN PATENT DOCUMENTS

| | | |
|---|---|---|
| JP | 2012080254 A | 4/2012 |
| JP | 2012090227 A | 5/2012 |
| JP | 2014230199 A | 12/2014 |
| JP | 2017123526 A | 7/2017 |

\* cited by examiner

DRAWING PERFORMANCE IMPROVEMENT FOR AN EXTERNAL VIDEO OUTPUT DEVICE

FIELD

The subject matter disclosed herein relates to information processing devices and more particularly relates to an apparatus, method, and computer program product for Drawing Performance Improvement For An External Video Output Device.

BACKGROUND

Some computing devices such as personal computers include a graphics processing unit ("GPU"). Certain personal computers include both an integrated e.g. built-in GPU and an external GPU board.

SUMMARY

An apparatus for activation control of an external display device for a meeting management device. In one embodiment, the apparatus includes a data transmitter that sends at least one of image data and sound data from an information processing device to an external device that outputs at least one of an image and sound; a signal transmitter that sends a wireless control signal for activating or inactivating the external device; and a device state detector that determines whether the external device is active.

In various embodiments, the signal transmitter includes an infrared transmitter for sending an infrared signal as the wireless control signal, the infrared signal being sent for switching between an active state and an inactive state of the external device. In certain embodiments, the device state detector detects via an HDMI cable connected to the external device whether the external device is active. In some embodiments, the apparatus further includes an image capture device that captures an image of a predetermined range including the external device, wherein the device state detector determines, based on image information obtained by capturing the image, whether the external device is active. In various embodiments, the apparatus includes an attendee detector that detects one or more users, wherein the signal transmitter sends the wireless control signal in response to detecting the one or more users.

In one embodiment, the apparatus includes a scheduling unit that obtains schedule information including time information concerning progress of an event in which the information processing device is used and a meeting status unit that determines whether the time information satisfies a predetermined setting condition, where the signal transmitter sends the wireless control signal in response to the time information satisfies the predetermined setting condition. In some embodiments, the apparatus further includes a scheduling unit that obtains schedule information including an attendee ID used in an event in which the information processing device is used and a meeting status unit for determining whether a terminal device used by a user identified by the attendee ID is connected, where the signal transmitter sends the wireless control signal in response to determining that the terminal device used by the user identified by the attendee ID is connected. In some embodiments, the signal transmitter resends the wireless control signal in response to determining that the external device is not active.

A method is disclosed that includes sending at least one of image data and sound data from an information processing device to an external device that outputs at least one of an image and sound, sending a wireless control signal for activating or inactivating the external device, and determining whether the external device is active.

In some embodiments, the method further includes sending an infrared signal as the wireless control signal, the infrared signal being sent for switching between an active state and an inactive state of the external device. In various embodiments, the method further includes detecting via an HDMI cable whether the external device is active. In certain embodiments, the method includes capturing an image of a predetermined range including the external device and determining, based on image information obtained by capturing the image, whether the external device is active. In some embodiments, the method includes detecting one or more users and sending the wireless control signal in response to detecting the one or more users. In various embodiments, the method includes obtaining schedule information including time information concerning progress of an event in which the information processing device is used, determining whether the time information satisfies a predetermined setting condition, and sending the wireless control signal in response to the time information satisfies the predetermined setting condition.

In various embodiments, the method includes obtaining schedule information including an attendee ID used in an event in which the information processing device is used, determining whether a terminal device used by a user identified by the attendee ID is connected, and sending the wireless control signal in response to determining that the terminal device used by the user identified by the attendee ID is connected. In certain embodiments, the method includes resending the wireless control signal in response to determining that the external device is not active.

A computer program product is disclosed that includes a computer readable storage medium that stores code executable by a processor, the executable code comprising code to send at least one of image data and sound data from an information processing device to an external device that outputs at least one of an image and sound, send a wireless control signal for activating or inactivating the external device, and determine whether the external device is active.

In various embodiments, the code is further executable to send an infrared signal as the wireless control signal, where the infrared signal is sent to switch between an active state and an inactive state of the external device. In some embodiments, the code is further executable to detect one or more users and send the wireless control signal in response to detecting the one or more users. In certain embodiments, the code is further executable to obtain schedule information including an attendee ID used in an event in which the information processing device is used, determine whether a terminal device used by a user identified by the attendee ID is connected, and send the wireless control signal in response to determining that the terminal device used by the user identified by the attendee ID is connected.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
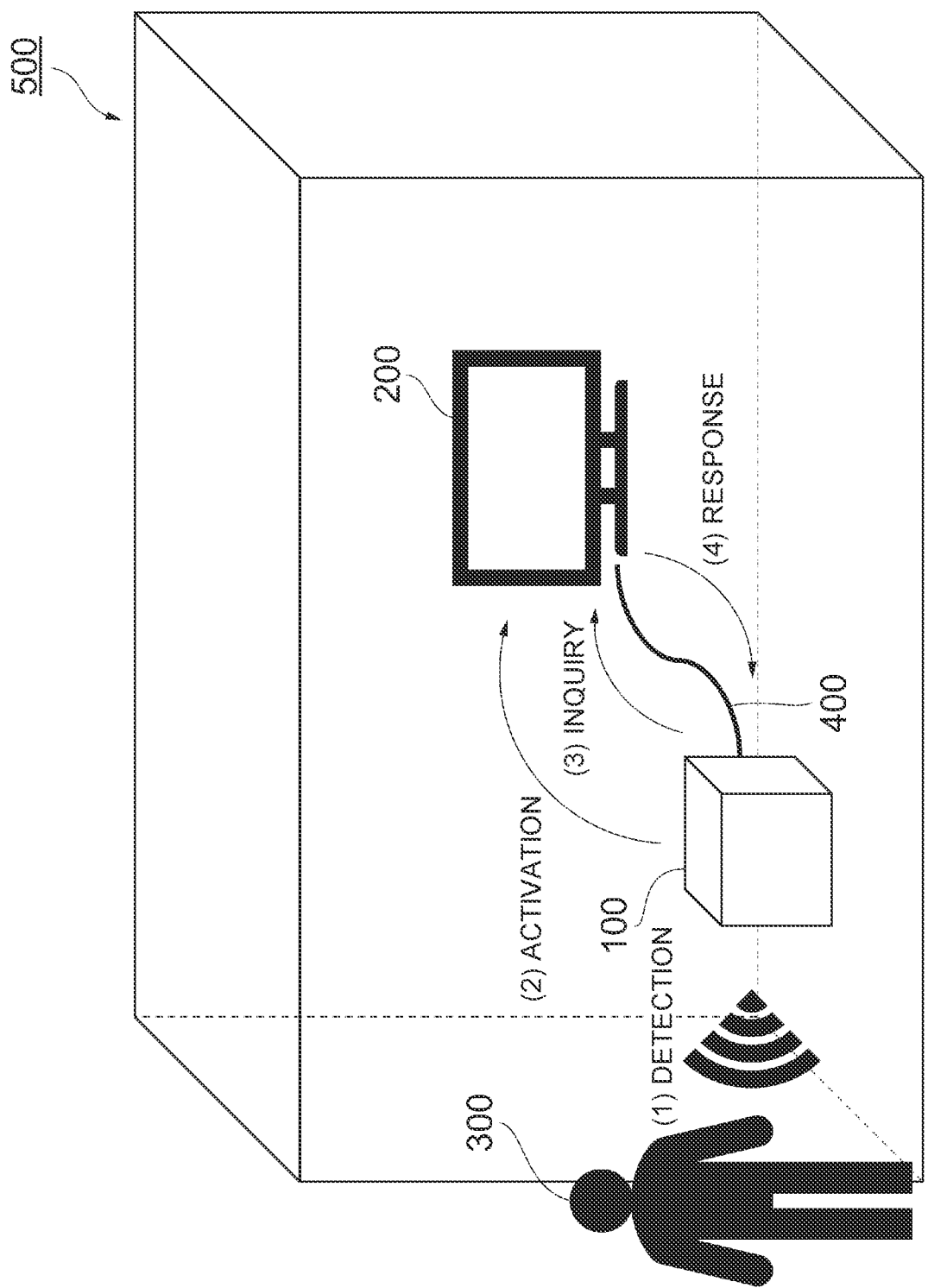
FIG. 1 is a schematic block diagram illustrating one embodiment of a meeting management system.

Referring to the following drawings, preferred embodiments of the present invention will be described. In the respective drawings, members assigned with the same reference numerals have the same or similar structures.

In the embodiments below, "a meeting" will be described as one example of "an event" in which an information processing device is used. This, however, is not an exclusive example, and any other events or occasions are applicable without limitation. Further, in the embodiments below, "a display device" is described as one example of "an external device". This, however, is not an exclusive example, and "an external device" includes any other output devices, for example, a projector or a speaker, that output at least one of images and sounds.

Assume that a player device tries to activate a traditional image display device using the CEC function. In the above, it is not possible to activate the image display device if the image display device is set in an operation mode that does not allow activation by means of the CEC function. As such, there is a problem in that a player device cannot activate an image display device, using the CEC function, depending on the content of the operation mode in which the image display device is set. Various embodiments of the present disclosure provide an information processing technique that enables activation of an external device irrespective of the content of the operation mode in which the external device is set, and reliable detection of the external device in the active state.

In one embodiment, an information processing device transmits at least one of image data and sound data, and includes a data transmitter for sending at least one of the image data and the sound data to an external device that outputs at least one of an image and sound, a signal transmitter for sending a wireless control signal for activating or inactivating the external device, and a first detection unit for determining whether the external device is active. The above-described aspect improves display technology for meeting management devices by providing an apparatus to send a wireless control signal for activating or inactivating an external device that outputs at least one of an image and sound to thereby activate the external device irrespective of the setting condition or the like of the external device. Further, various embodiments of the present disclosure enable determination as to whether the external device is active to make reliable detection of the external device in the active state.

FIG. 1 is a schematic block diagram illustrating one embodiment of a meeting management system 500. In one embodiment, the meeting management system 500 includes a meeting management device 100 (an information processing device) that can receive and transmit at least one of image data and sound data, and a display device 200 (an external device), or an electronic device for use in meetings, that outputs image data and sound data. For example, the meeting management device 100 is connected to the display device 200 via a High Definition Multimedia Interface (HDMI®) cable 400. Additional details of the functional structure of the meeting management device 100 are described below with respect to FIG. 2.

In one embodiment, the meeting management device 100 of the meeting management system 500 detects an attendee 300 entering, for example, a meeting room where a meeting to be managed will be held ((1) in FIG. 1). In response to detecting presence of the attendee 300 at the meeting, the meeting management device 100 determines that the meeting will start shortly, and then activates the display device 200 that displays, for example, reference materials for the meeting ((2) in FIG. 1). In various embodiments, the meeting management device 100 sends a wireless control signal (for example, a remote control signal) for activating or inactivating the display device 200 to the display device 200.

In response to an elapse of a first predetermined period of time after transmission of the wireless control signal, the meeting management device 100 determines via the HDMI cable whether the display device 200 is active or inactive. Specifically, the meeting management device 100 sends an inquiry signal to the display device 200, using the CEC function of HDMI, to inquire whether the display device 200 is active ((3) in FIG. 1). The display device 200, when being active, receives the inquiry signal, and then sends a response signal to the meeting management device 100 to notify that the display device 200 is active ((4) in FIG. 1). As used herein, the phrase "a first predetermined period of time" includes a period of time having elapsed after transmission of a wireless control signal by the meeting management device 100 to the display device 200 until determination as to whether the display device 200 has been activated or inactivated in response to the wireless control signal.

In various embodiments, having received the response signal, the meeting management device 100 detects that the display device 200 is active. Assuming that the display device 200 is not active, the meeting management device 100 cannot receive the response signal. Hence, the meeting management device 100 may detect that the display device 200 is not active in response to the meeting management device 100 not receiving the response signal within a predetermined period of time. In some embodiments, the meeting management system 500 enables automatic activation of the display device 200 for use in a meeting by detecting an attendee 300 entering the meeting room and determining whether the display device 200 has been actually activated.

Figure 2:
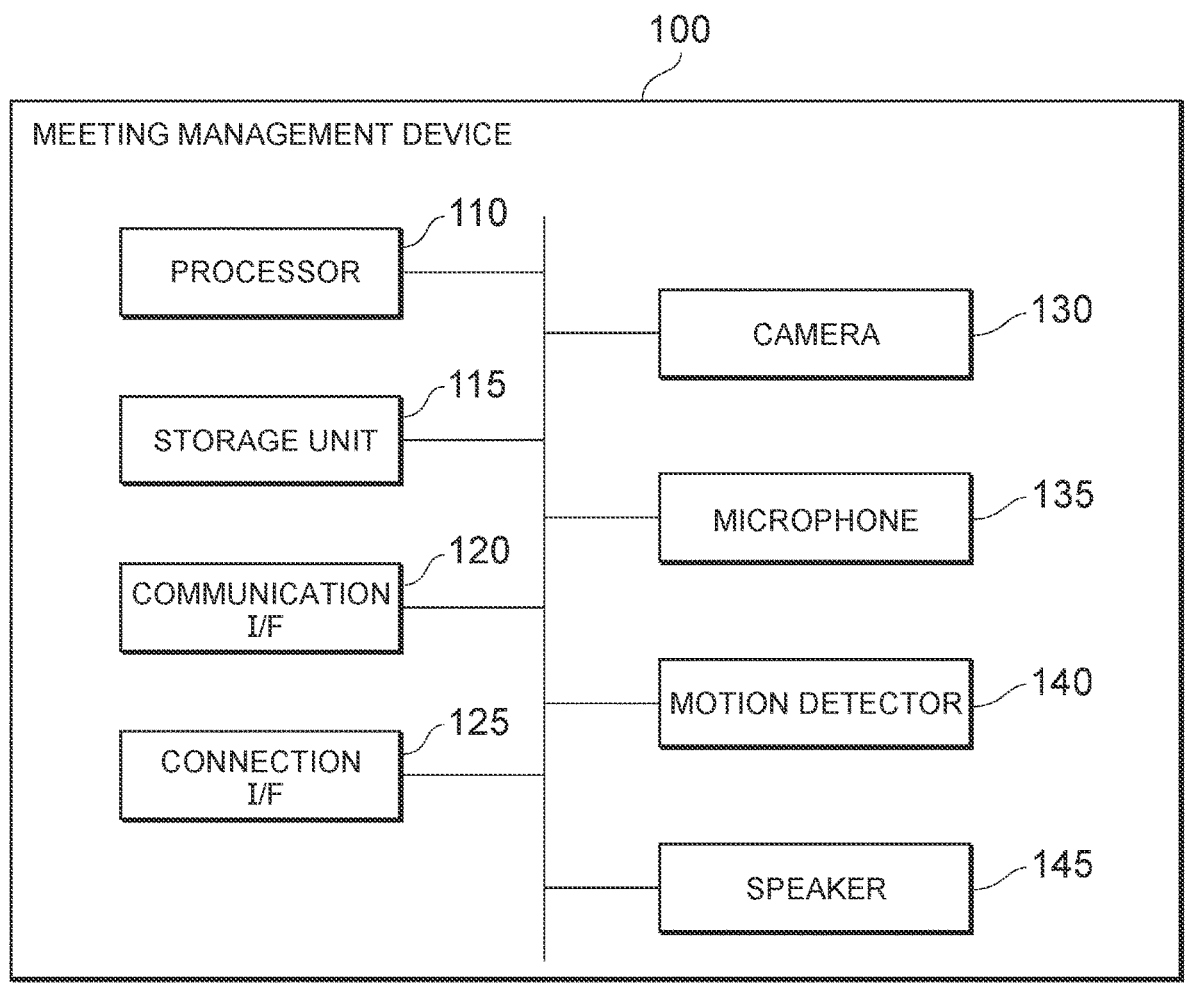
FIG. 2 is schematic hardware component block diagram illustrating one embodiment of a meeting management device.

FIG. 2 is schematic hardware component block diagram illustrating one embodiment of a meeting management device 100. In one embodiment, the meeting management device 100 includes a processor 110, a storage device 115, a communication interface 120, and a connection interface 125. The meeting management device 100 may include, for example, a camera 130, a microphone 135, a motion detector 140, or a speaker 145.

In some embodiments, the processor 110 is, for example, a processing device for operation, processing, and transfer of data, and program execution.

In various embodiments, the storage device 115 is a device for storing programs and data, including, for example, a main memory device (for example, a volatile memory or a random access memory), an auxiliary memory device (for example, a nonvolatile memory), or an external storage device.

In certain embodiments, the communication interface 120 is a device for receiving and transmitting data and control signals with respect to the display device 200. In one embodiment, the communication interface 120 includes, for example, interfaces for communication networks for portable phones and interfaces for wireless LANs, such as Wi-Fi networks. In some embodiments, the communication interface 120 includes wired interfaces. In various embodiments, the communication interface sends a wireless control signal for controlling the display device 200. As used herein, the phrase "a wireless control signal" refers to a remote control signal for controlling, for example, the display device 200 from the meeting management device 100, and is, for example, an analog signal, such as an infrared signal in the Infrared Data Association (IrDA) format. In various embodiments, the wireless control signal is a digital signal sent using interfaces for wireless LANs.

In one embodiment, the connection interface 125 includes a device for connecting the meeting management device 100 to the display device 200 to exchange control signals between the meeting management device 100 and the display device 200. In some embodiments, the connection interface 125 includes, for example, an HDMI controller and an HDMI terminal, and connect the meeting management device 100 to a display device via an HDMI cable. Further, in various embodiments, the connection interface 125 receives and/or transmits a control signal for the CEC function (hereinafter referred to as a "CEC control signal") to connect the meeting management device 100 to a display device via an HDMI cable.

In various embodiments, the camera 130 includes a device for capturing images (static images or motion pictures). For example, the camera 130 captures an image of a predetermined range to thereby obtain image information, and stores the captured image information in the storage device 115. In certain embodiments, the camera 130 is provided outside the meeting management device 100.

In one embodiment, the microphone 135 includes a device for inputting sound around the meeting management device 100 (for example, sounds made by the attendees 300 at the meeting).

In certain embodiments, the motion detector 140 includes a device for detecting the location of people, for example, using infrared radiation, ultrasound, or visible light. In some embodiments, the motion detector 140 is provided outside the meeting management device 100.

In one embodiment, the speaker 145 includes a device for outputting sound. The speaker 145 in some embodiments, is provided outside the meeting management device 100.

Figure 3:
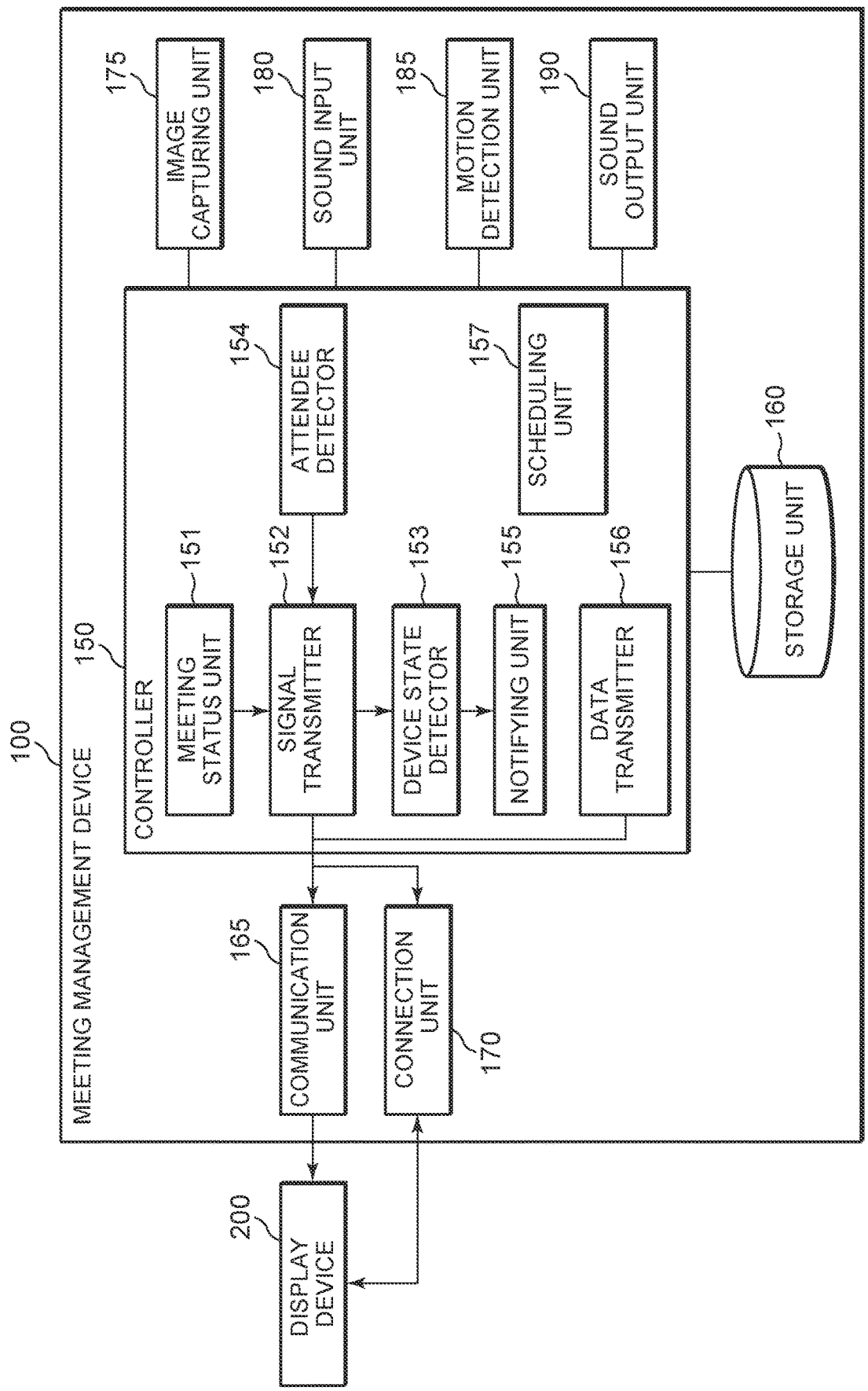
FIG. 3 is schematic functional block diagram illustrating one embodiment of a meeting management device.

FIG. 3 is schematic functional block diagram illustrating one embodiment of a functional structure of the meeting management device 100.

In one embodiment, the meeting management device 100 includes a controller 150, a storage unit 160, a communication unit 165, and a connection unit 170. In certain embodiments, the meeting management device 100 includes, for example, an image capture device 175, a sound input unit 180, a motion detection unit 185, and/or a sound output unit 190.

The respective functions illustrated in FIG. 3 are implemented using the hardware and/or software of the meeting management device 100. In some embodiments, these functions can be implemented, for example, using the storage area of the storage device 115 or by the processor 110 by executing a program stored in the storage device 115.

In one embodiment, the controller 150 includes a signal transmitter (also referred to as a second transmission unit) 152 for sending a wireless control signal for activating the display device 200, a device state detector 153 for determining whether the display device 200 is active, and a data transmitter (e.g., a first transmission unit) 156 for sending at least one of image data and sound data to the display device 200. The controller 150 includes in some embodiments, for example, a meeting status unit 151 for determining the status of a meeting, an attendee detector 154 for detecting an attendee 300 at a meeting, a notifying unit 155 for notifying whether the display device 200 is active, and/or a scheduling unit 157 for obtaining schedule information on a meeting. In one embodiment, the controller 150 corresponds to the processor 110 in FIG. 2.

The meeting status unit 151 determines the status of a meeting (or a meeting status). A used herein, "meeting status" refers to the progress of a meeting, such as start, suspension, resuming, or end of a meeting.

The meeting status unit 151, in some embodiments, determines, for example, whether time information on the progress of the meeting satisfies a predetermined setting condition. "The time information on the progress of a meeting" includes, for example, time information indicating the present time. "A predetermined setting condition" refers to, for example, a setting condition as to whether the present time has reached the scheduled start time of the meeting or as to whether the present time has reached the scheduled end time of the meeting.

In certain embodiments, while referring to the information (meeting schedule information) such as scheduled meeting start or end time information obtained from a schedule server, for example, via the scheduling unit 157 and registered in advance in the storage unit 160, for example, the meeting status unit 151 determines that the setting condition is satisfied in response to determining that the present time has reached the scheduled start or end time of the meeting.

In one embodiment, the meeting status unit 151 determines that the meeting status is "start" when a terminal device used by a user is made connected to the meeting management system 500. In such an embodiment, for example, the scheduling unit 157 obtains schedule information including the ID information of the attendees at the meeting from the schedule server and registered the schedule information in advance, for example, in the storage unit 160. In various embodiments, the information is not registered in advance, for example, in the storage unit 160, and the schedule sever is queried for the information when the information is necessary in the processing. When the terminal (not illustrated) of a user is made connected to the meeting management system 500, the meeting status unit 151 obtains the user ID of the terminal. The user ID of the terminal is compared with an attendee ID included in the schedule information. When the user ID coincides with the attendee ID, it is determined that the meeting status is "start".

In various embodiments, the signal transmission unit 152 sends a wireless control signal for activating (for turning on) the display device 200, depending on the meeting status.

For example, in response to the meeting status unit 151 determining that the meeting status is "the start of the meeting," the signal transmission unit 152 sends a wireless control signal for activating the display device 200 via the communication unit 165. In one embodiment, in response to the meeting status unit 151 determining that the meeting status is "the end of the meeting," the signal transmission unit 152 sends a wireless control signal for inactivating (for turning off) the display device 200 to the communication unit 165.

The communication unit 165 is a functional unit that sends a wireless control signal for activating the display device 200 to the display device 200 under the control by the controller 150. In on embodiment, the communication unit 165 corresponds to the communication interface 120 in FIG. 2.

In various embodiments, the signal transmission unit 152 sends a wireless control signal via the communication unit 165, for example, when the meeting status unit 151 determines that the predetermined setting condition is satisfied. This structure makes it possible to activate the display device 200 in accordance with the progress of the meeting even without input of an operation for activation. For example, in some embodiments, the signal transmission unit 152 has an infrared transmitter (not illustrated) for sending, for example, an infrared toggle signal for switching between the active state and the inactive state of the display device 200 as a wireless control signal.

In certain embodiments, in response to the device state detector 153 failing to detect within a predetermined period of time that the display device 200 is active, the signal transmission unit 152 may cause the communication unit 165 to resend a wireless control signal. This structure enables automatic retrial to activate the display device 200 even after failure in activation of the display device 200. The signal transmission unit 152 may set an upper limit on the number of times for resending for the resending processing, for example, so that the communication unit 165 resends the signal at the number of times not in excess of the upper limit.

In one embodiment, the device state detector 153 determines whether the display device 200 is active. Since the infrared signal sent from the signal transmission unit 152 in some embodiments, is a toggle signal, determination by the device state detector 153 as to whether the display device 200 is active is necessary. In such embodiments, the device state detector 153 inquires whether the display device 200 is active, using the CEC function via the HDMI cable, for example, to determine whether the display device 200 is active. This structure makes it possible to determine whether the display device 200 is active, for example, using the HDMI cable that is connected to display images on the display device 200.

The device state detector 153, for example, connected to the display device 200 via the connection unit 170 and the HDMI cable, inquires of the display device 200 through the connection whether the display device 200 is active, using a CEC control signal. Thereafter, based on a CEC control signal returned in response to the inquiry from the display device 200, the device state detector 153 determines whether the display device 200 is active. For example, in the case that a control signal including a signal indicating that the activation state is "turned on" cannot be received from the display device 200 within a predetermined period of time, the device state detector 153 determines that the display device 200 is not active. The connection unit 170 is a functional unit for connecting the meeting management device 100 to the display device 200 under the control by the controller 150 to exchange control signals in a bidirectional way between the meeting management device 100 and the display device 200. The connection unit 170 corresponds to the connection interface 125 in FIG. 2.

The device state detector 153 may analyze the image information on a predetermined range including the display device 200, the image information being captured by the image capture device 175, to determine whether the display device 200 is active. The image capture device 175 is a functional unit for capturing images under the control by the controller 150 to obtain image information. The image capture device 175 corresponds to the camera 130 in FIG. 2.

In some embodiments, the device state detector 153 compares the image information obtained through image capturing with a characteristic pattern (for example, a screen image of the display device 200 in an off state) indicating the end state of the display device 200, the characteristic pattern being registered in advance in the storage unit 160, for example, using an image recognition technique. When the result of such a comparison shows that the image information does not coincide with the characteristic pattern with a predetermined rate, the device state detector 153 determines, in various embodiments, that the display device 200 is active.

In certain embodiments, the device state detector 153 compares the image information with the characteristic pattern, and in response to the comparison showing a match between the image information and the characteristic pattern with a predetermined rate, the device state detector 153 determines that the display device 200 is not active. As used herein, "a predetermined rate" refers to a threshold for a determination as to whether the activation state of the display device 200, indicated by the image information, coincides with the activation state, namely, the end state, indicated by the characteristic pattern indicating the end state of the display device 200. For example, "a predetermined rate" is in various embodiments, set to 80%, 90% or the like.

This structure makes it possible to determine whether the display device 200 is active irrespective of not only the setting condition of the display device 200 but also the type and ambient environment (for example, an environment in the absence of communication networks such as wireless LAN) of the display device 200.

In one embodiment, an attendee detector 154 detects one or more users. In some embodiments, the attendee detector 154 detects one or more users, for example, based on the result of detection relevant to a predetermined area by the motion detection unit 185. The motion detection unit 185 is a functional unit for detecting the presence of one or more people in a predetermined area. In some embodiments, the motion detection unit 185 corresponds to the motion detector 140 in FIG. 2. The term "A predetermined area," as used herein, includes an area that allows the motion detection unit 185 to determine whether there are one or more users therein.

In one embodiment, in response to detecting a presence of one or more users by the attendee detector 154, the signal transmission unit 152 sends a wireless control signal for activating the display device 200 via the communication unit 165. This structure makes it possible to detect the start of a meeting upon detection of at least one user entering the meeting room, and then to activate the display device 200. That is, it is possible to activate the display device 200 even without a user's input of an operation for activating the display device 200.

Also, upon detection of all users having left the meeting room, a wireless control signal for inactivating the display device 200 is sent via the communication unit 165. This structure makes it possible to determine the end of the meeting upon detection of all users having left the meeting room, and then to inactivate the display device 200. That is, it is possible to inactivate the display device 200 even without a user's input of an operation for inactivating the display device 200. In some embodiments, the signal transmission unit 152 does not inactivate the display device 200 immediately after the detection of all users having left the meeting room, the detection being made by the attendee detector 154, but determines the end of the meeting in response to no user being detected for a second predetermined period of time after the detection of all users having left the meeting room, and then sends a wireless control signal for inactivating the display device 200 via the communication unit 165. The term "A second predetermined period of time" as used herein refers to a period of time necessary to detect the presence or status of a user in accordance with the meeting status.

In various embodiments, the attendee detector 154 detects sounds made by people within ambient sounds around the meeting management device 100 collected by the sound input unit 180 to thereby detect the presence of one or more attendees 300 (users) at the meeting and thereupon determine the start of the meeting. The sound input unit 180 is a functional unit for inputting sound under the control by the controller 150 to obtain sound information. The sound input unit 180 corresponds to the microphone 135 in FIG. 2. As a still another example, the attendee detector 154 in some embodiments, analyzes an image of a predetermined area including the display device 200, the image being captured by the image capture device 175, to detect the presence of one or more attendees 300 at the meeting. Specifically, the attendee detector 154 captures an image of an area near a door of a meeting room, and compares the image information obtained through image capturing with a characteristic pattern indicating the presence of one or more attendees 300 registered in advance in the storage unit 160. Based on the result of comparison, the attendee detector 154 may detect one or more attendees 300 at the meeting. "A predetermined area" includes an area whose image is to be captured by the image capture device 175.

In one embodiment, the notifying unit 155 causes the sound output unit 190 to output a sound informing whether the display device 200 is active, which is detected by the device state detector 153, to thereby notify the attendees 300 at the meeting. In some embodiments, the sound output unit 190 is a functional unit for outputting a sound under the control by the controller 150, the sound indicating whether the display device 200 is active or a meeting status determined by the meeting status unit 151. In certain embodiments, the sound output unit 190 corresponds to the speaker 145 in FIG. 2.

In one embodiment, in response to the device state detector 153 detecting that the display device 200 is active, the notifying unit 155 causes the sound output unit 190 to output the sound "successfully activated". In response to the device state detector 153 detecting at least once or more that the display device 200 is inactive, the notifying unit 155 in some embodiments, causes the sound output unit 190 to output the sound "activation failed". With these notifications, the notifying unit 155 notifies the attendee 300 at the meeting. In addition, the notifying unit 155 in one embodiment, causes the sound output unit 190 to output, for example, a sound indicating a meeting status determined by the meeting status unit 151 to thereby notify the attendees 300 at the meeting. This structure makes it possible to notify an attendee 300 at the meeting of whether the display device 200 has been successfully activated and whether the display device 200 is active when the attendee 300 is in a place where the attendee 300 cannot see the display device 200.

In one embodiment, the storage unit 160 stores a meeting management program including a meeting management function according to this embodiment. The storage unit 160 may store meeting schedule information obtained by the scheduling unit 157 from a schedule server or the like, image information captured by the image capture device 175, information indicating a characteristic pattern indicating the end state of the display device 200, or information indicating a characteristic pattern indicating the presence of one or more attendees 300. In certain embodiments, the storage unit 160 corresponds to the storage device 115 in FIG. 2.

Figure 4:
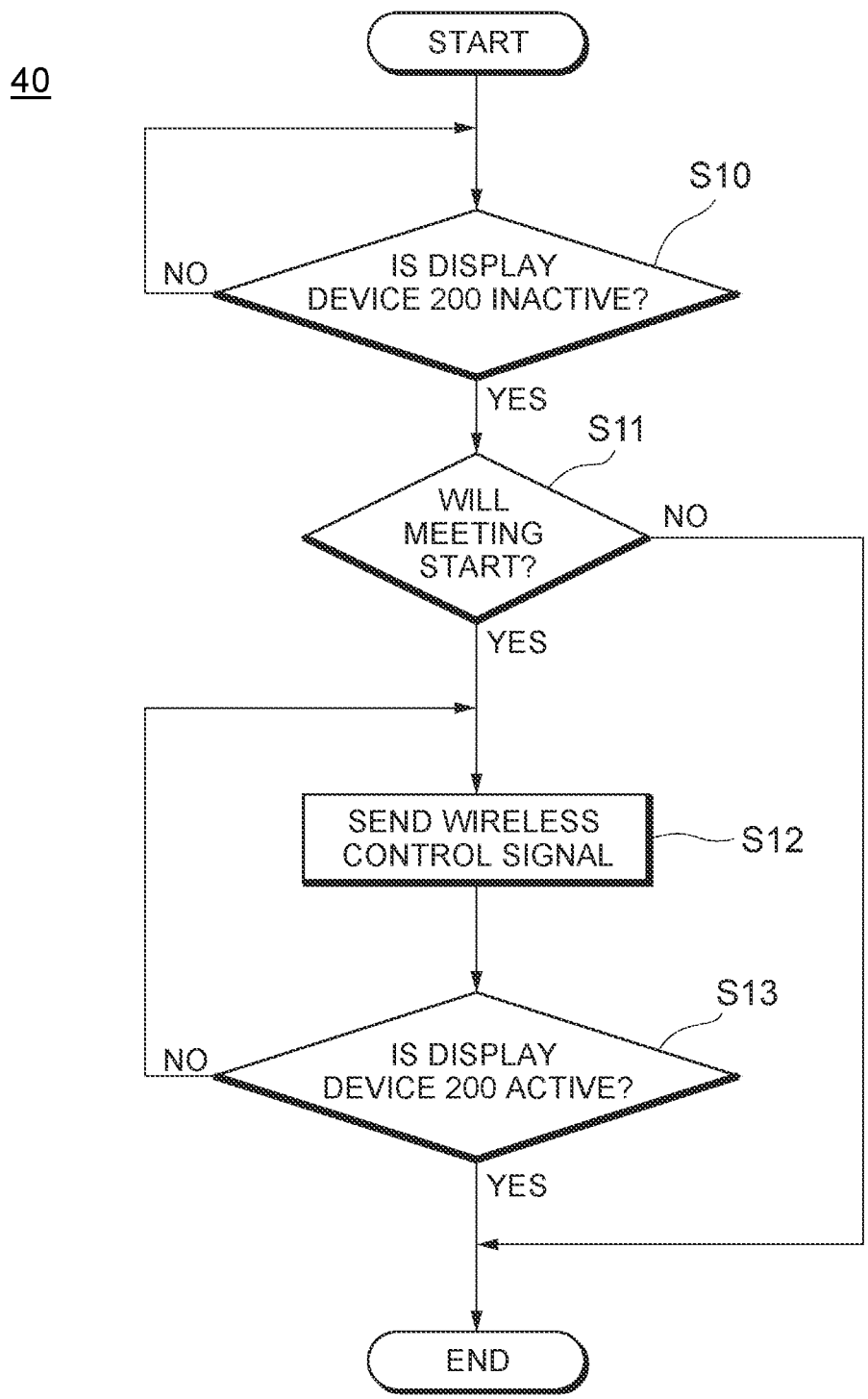
FIG. 4 is a flowchart diagram illustrating one embodiment of a method for reliable activation of an external display device for a meeting management device.

FIG. 4 is a flowchart diagram illustrating one embodiment of a method 40 for reliable activation of an external display device for a meeting management device. In one embodiment, the method 40 begins and determines S10 whether the display device 200 is active. Determining whether the display device 200 is active is performed using any of the above-described methods. For example, if the meeting management device 100 is connected to the display device 200 via an HDMI cable, the meeting management device 100 inquires whether the display device 200 is active, using a CEC control signal via the HDMI cable.

Then, based on a CEC control signal received from the display device 200 in response to the inquiry, the meeting management device 100 determines whether the display device 200 is active. In response to the method 40 determining that the meeting management device 100 does not detect that the display device 200 is inactive ("NO" at S10), the method 40 repeats determining S10 whether the display device 200 is inactive. In response to the method 40 determining that the display device 200 is inactive ("YES" at S10), the method 40 proceeds to S11.

The method 40 then determines the meeting status in an event-driven or fixed cycle. In one embodiment, the method 40 uses the meeting management device 100 to detect the presence of one or more attendees 300 at a meeting to determine S11 whether the meeting status is the start of the meeting. In response to the method 40 determining S11 that the meeting status is "the start of a meeting" ("YES" at S11), the meeting management device 100 sends S12 a wireless control signal to the display device 200 to activate the display device 200. In response to the method determining S11 that the meeting status is not "the start of a meeting" (NO at S11), the method 40 ends the activation control processing.

The method 40 continues and after a first predetermined period of time after the transmission of the wireless control signal, the meeting management device 100 determines S13 whether the display device 200 is active. In response to determining S13 that the display device 200 is active ("YES" at S13), the 400 ends. Meanwhile, in the case that the meeting management device 100 cannot detect that the display device 200 is active (NO at S13), the operation flow returns to step S12 to resend a wireless control signal to activate the display device 200.

In various embodiments, the above-described respective steps of the operation flow may be executed in any desired order different from the above-mentioned order or two or more steps can be executed in parallel provided no contradiction in content of operation is caused. Further, any additional step may be executed between the steps. Still further, any single step mentioned above can be divided into two or more steps to be executed, or two or more steps mentioned above can be executed as a single step instead.

Although the present disclosure has been described based on the above-described embodiments, the present disclosure is not limited to such embodiments. In some embodiments, a trigger for sending a wireless control signal for activating or inactivating an external device is implemented in various manners. In various embodiments, the method 40 is carried out by the meeting management system 500 also referred to as an information processing device 100. For example, in certain embodiments, the meeting status unit 151 determines whether a terminal device operated by a user is connected to the meeting management system 500 as illustrated in FIG. 1 to thereby determine the meeting status.

For example, in one embodiment, image data and/or sound data input via an image or sound input terminal or similar input of the meeting management device 100 is detected to determine whether the terminal device is connected. In response to at least one terminal device being connected to the meeting management system 500, the meeting status unit 151 determines, in various embodiments, that the meeting status is "the start of a meeting". Meanwhile, in the case that all terminal devices once connected to the meeting management system 500 are disconnected from the meeting management system 500, the meeting status unit 151 may determine that the meeting status is "the end of the meeting". The meeting status unit 151 may determine the meeting status, based on whether a specific terminal device is connected to the meeting management system 500.

In certain embodiments, the meeting status unit 151 determines the meeting status, based on the operating condition of a tool for use in a meeting, where the tool is installed in a terminal device of the meeting management device 100. For example, when the controller 150 or the like detects that reference materials for presentation in a meeting are accessed or opened by such a tool as data viewing software in a terminal device, the meeting status unit 151 determines, in one embodiment, that the meeting status is "the start of a meeting". Similarly, in response to the controller 150 detecting that the materials are closed by such a tool as this viewing software, the meeting status unit 151 determines that the meeting status is "the end of the meeting".

In one embodiment, an activation state, including whether the display device 200 has been successfully activated and whether the display device 200 is active, is communicated to a user, such as an attendee 300 at the meeting, by outputting sound, the aspect of notification is not limited to sound output. For example, the activation state or the like of the display device 200 may be notified by showing information indicating whether the display device 200 has been successfully activated or whether the display device 200 is active, for example, on the terminal of a smart phone carried by a user.

In one embodiment, a wireless control signal for activating the display device 200 is sent via the communication unit 165, based on the result of determination by the meeting status unit 151 and the result of detection by the attendee detector 154, a wireless control signal for activating the display device 200 may be sent via the communication unit 165, based on one of the result of determination by the meeting status unit 151 and the result of detection by the attendee detector 154.

In various embodiments, the structures, functions, and other features are practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a data transmitter that sends at least one of image data and sound data from an information processing device to an external device that outputs at least one of an image and sound;
    a signal transmitter configured to send a wireless control signal for activating or inactivating the external device;
    an attendee detector that is configured to process image data from a camera and sound data collected by a sound input unit configured to detect sounds made by one or more attendees entering a room in which the apparatus and the external device are disposed from within ambient sounds around the apparatus; and
    a device state detector that determines whether the external device is active,
    wherein, in response to the attendee detector determining, based on the sounds made by the one or more attendees, that the one or more attendees are entering the room in which the apparatus and the external device are disposed, the signal transmitter sends the wireless control signal to activate the external device in response to the device state detector determining that the external device is not active;
    a scheduling unit that obtains schedule information including an attendee ID used in a meeting in which the information processing device is used; and
    a meeting status unit for determining whether a terminal device used by a user identified by the attendee ID is connected to the apparatus and determining a status indicating the progress of the scheduled meeting,
    wherein the signal transmitter sends the wireless control signal in response to the attendee detector determining that the one or more attendees are entering the room and that the terminal device used by the user identified by the attendee ID is currently connected to the apparatus.

2. The apparatus of claim 1, wherein the signal transmitter includes an infrared transmitter for sending an infrared signal as the wireless control signal, the infrared signal being sent for switching between an active state and an inactive state of the external device.

3. The apparatus of claim 1, further comprising a connection unit that connects to the external device via an HDMI cable, wherein the device state detector inquires via the HDMI cable connected to the external device whether the external device is active.

4. The apparatus of claim 1, further comprising an image capture device that captures an image of a predetermined range including the external device, wherein the device state detector determines, based on image information obtained by capturing the image, whether the external device is active.

5. The apparatus of claim 3, wherein in response to the attendee detector detecting that all of the one or more attendees have left the room, the signal transmitter sends a signal to inactivate the external device.

6. The apparatus of claim 1, wherein:
    the meeting status unit determines whether the time information satisfies a predetermined setting condition indicating that the meeting status is the start of the event, and
    wherein the signal transmitter sends the wireless control signal in response to the attendee detector determining that the one or more attendees are entering the room and the meeting status unit determining that the time information satisfies the predetermined setting condition indicating that the meeting status is the start of the meeting.

7. The apparatus of claim 1, wherein the signal transmitter resends the wireless control signal in response to determining that the external device is not active.

8. A method comprising:
   detecting, using an meeting management device, one or more attendees entering a room based on detecting sounds made by attendees entering a room in which the meeting management device and an external device are disposed from within ambient sounds around the meeting management device, wherein the room contains the meeting management device and the external device configured to output at least one of an image and sound;
   determining whether the external device is active in response to detecting the one or more attendees entering the room;
   obtaining schedule information including an attendee ID used in a meeting in which the meeting management device is used and determining the a status indicating the progress of the scheduled meeting;
   determining whether the one or more attendees are entering the room and that the terminal device used by the user identified by the attendee ID is currently connected to the apparatus;
   sending a wireless control signal for activating the external device in response to determining that the external device is not active and that the one or more attendees are entering the room and that the terminal device used by the user identified by the attendee ID is currently connected to the apparatus; and
   sending at least one of image data and sound data from the meeting management device to the external device that outputs the at least one of the image and the sound.

9. The method of claim 8, further comprising sending an infrared signal as the wireless control signal, the infrared signal being sent for switching between an active state and an inactive state of the external device.

10. The method of claim 8, wherein determining whether the external device is active comprises detecting via an HDMI cable whether the external device is active.

11. The method of claim 8, wherein determining whether the external device is active comprises capturing an image of a predetermined range including the external device and determining, based on image information obtained by capturing the image, whether the external device is active.

12. The method of claim 8, further comprising:
   sending the wireless control signal in response to detecting the one or more attendees entering the room and determining that the status of the scheduled meeting indicates the start of the meeting.

13. The method of claim 8, further comprising resending the wireless control signal in response to determining that the external device is not active.

14. A computer program product comprising a non-transitory computer readable storage medium that stores code executable by a processor, the executable code comprising code to:
   detect one or more attendees entering a room based on detecting sounds made by attendees entering a room, in which the meeting management device and an external device configured to output at least one of an image and a sound are disposed, from within ambient sounds around a meeting management device;
   obtain schedule information including an attended ID and a status indicating progress of a meeting in which the meeting management device is used; and
   determine whether the one or more attendees are entering the room and that a terminal device used by the user identified by the attendee ID is currently connected to the meeting management device and in response sending a wireless control signal for activating the external device in response to further determining that the external device is not active; and
   sending at least one of image data and sound data from the meeting management device to the external device that outputs the at least one of the image and the sound.

15. The computer program product of claim 14, wherein the code is further executable to send an infrared signal as the wireless control signal, wherein the infrared signal is sent to switch between an active state and an inactive state of the external device.

16. The computer program product of claim 14, wherein a status of the meeting indicates the start of the meeting.

* * * * *